Sept. 23, 1930.    L. J. SIMON ET AL    1,776,742
METHOD OF AND APPARATUS FOR EXTRACTION OF OILS,
FATS, WAXES, GREASES, AND THE LIKE FROM
MATERIAL CONTAINING THE SAME
Filed April 8, 1926    15 Sheets-Sheet 1
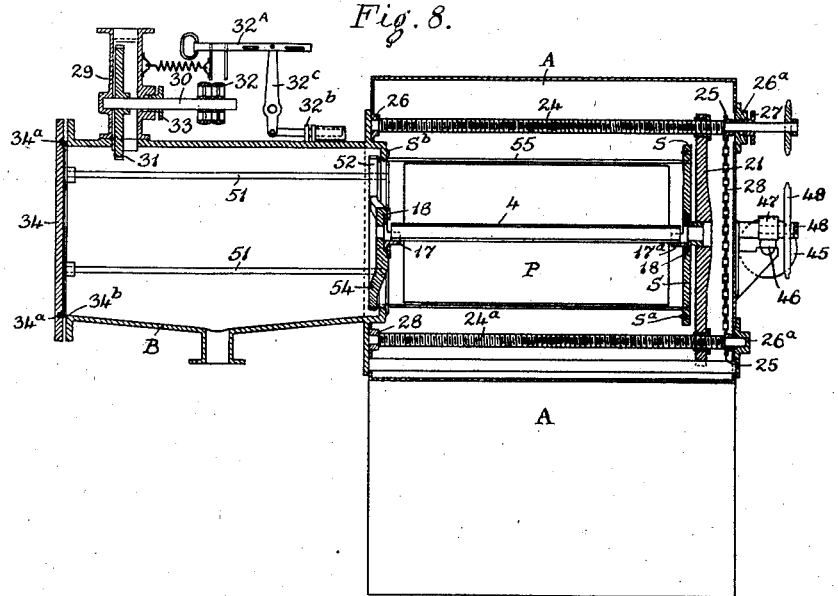
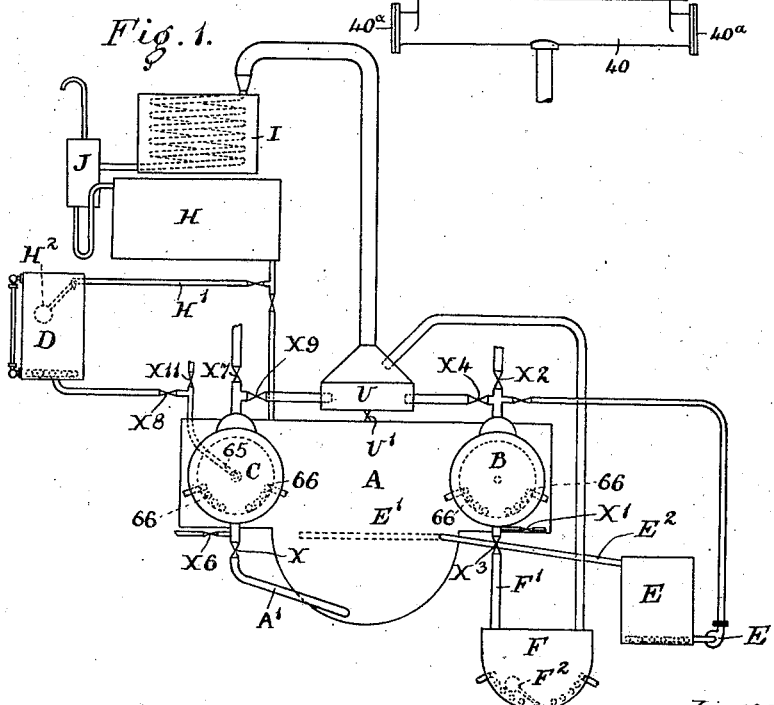
Inventors
Louis J. Simon
Abram Simon
By
Attorney Sept. 23, 1930.                L. J. SIMON ET AL                1,776,742
      METHOD OF AND APPARATUS FOR EXTRACTION OF OILS,
         FATS, WAXES, GREASES, AND THE LIKE FROM
                MATERIAL CONTAINING THE SAME
                   Filed April 8, 1926        15 Sheets-Sheet 2
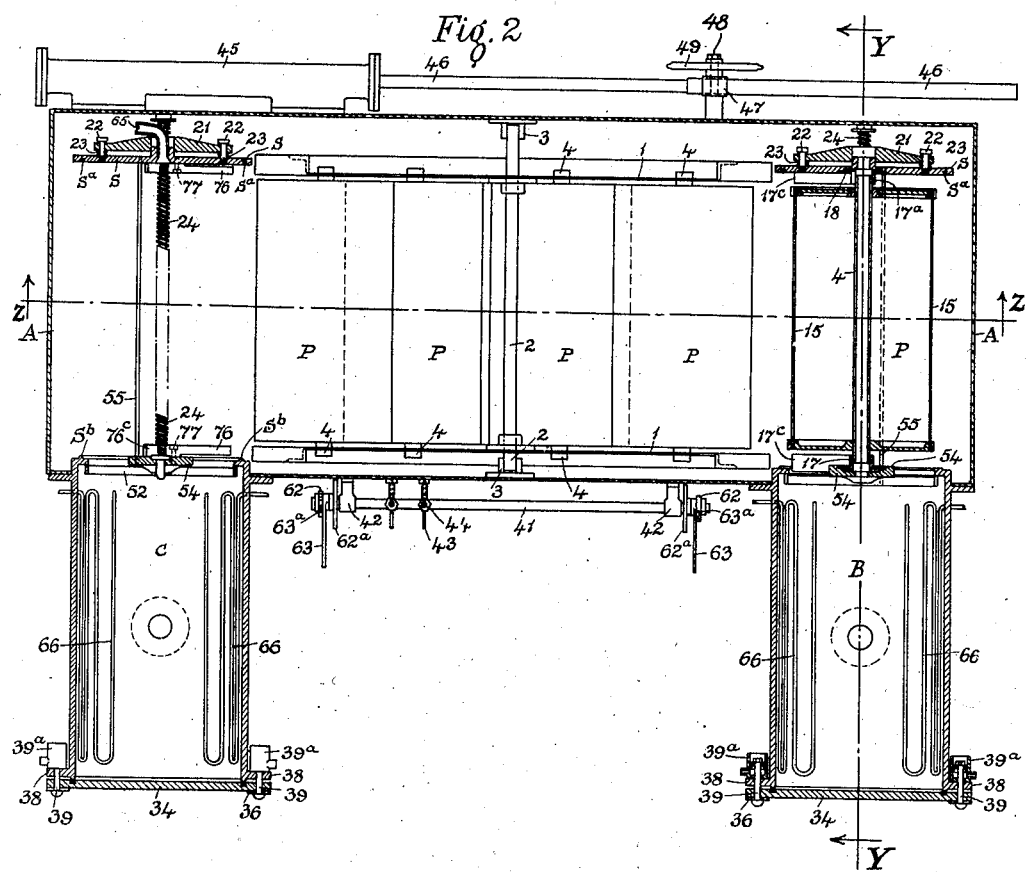
Inventors
Louis J. Simon
Abram Simon
By
Attorney

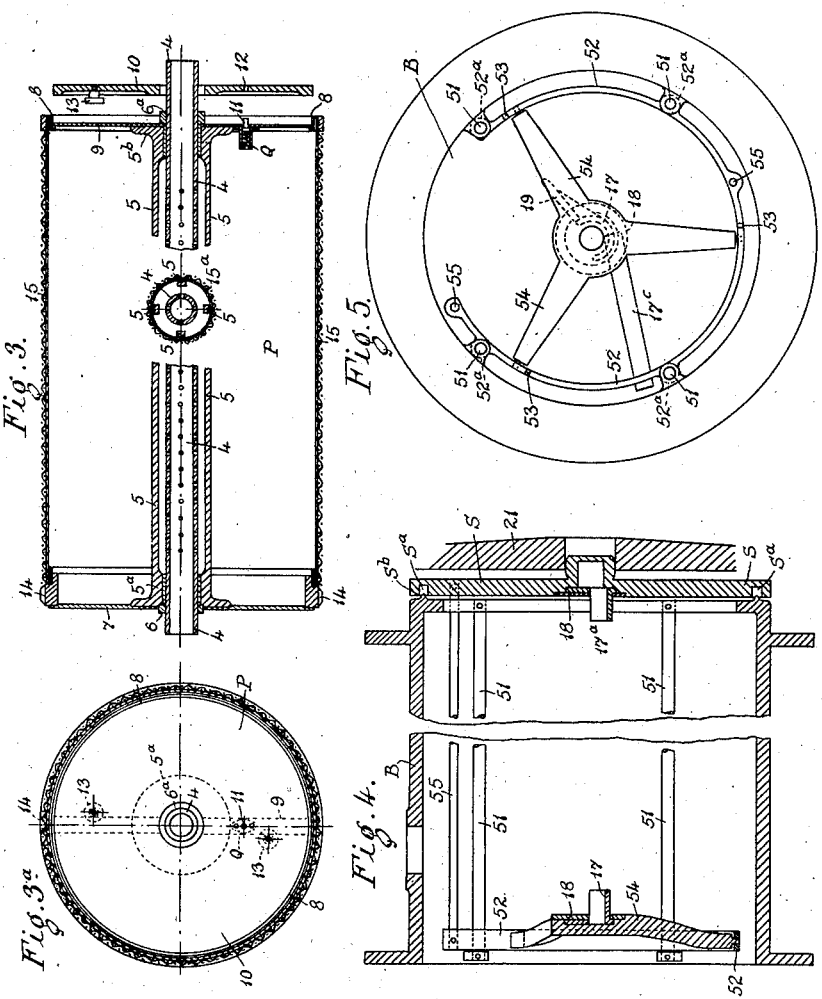

Sept. 23, 1930.  L. J. SIMON ET AL  1,776,742
METHOD OF AND APPARATUS FOR EXTRACTION OF OILS,
FATS, WAXES, GREASES, AND THE LIKE FROM
MATERIAL CONTAINING THE SAME
Filed April 8, 1926   15 Sheets-Sheet 4
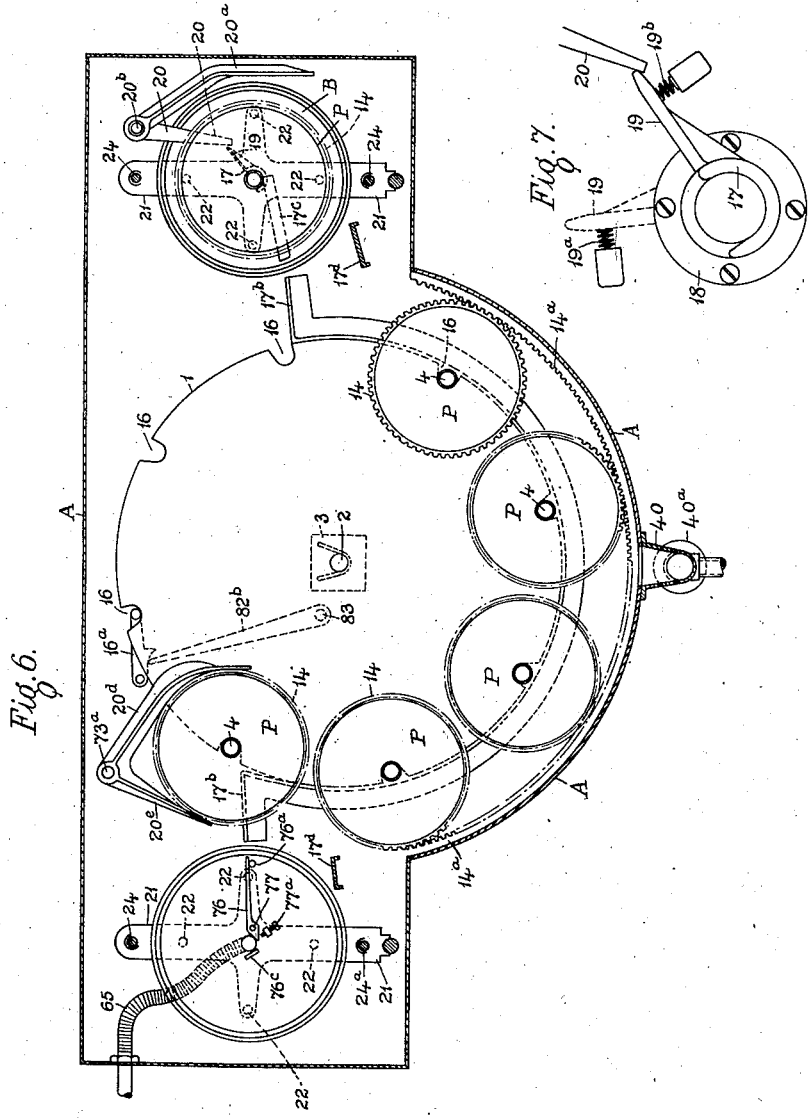

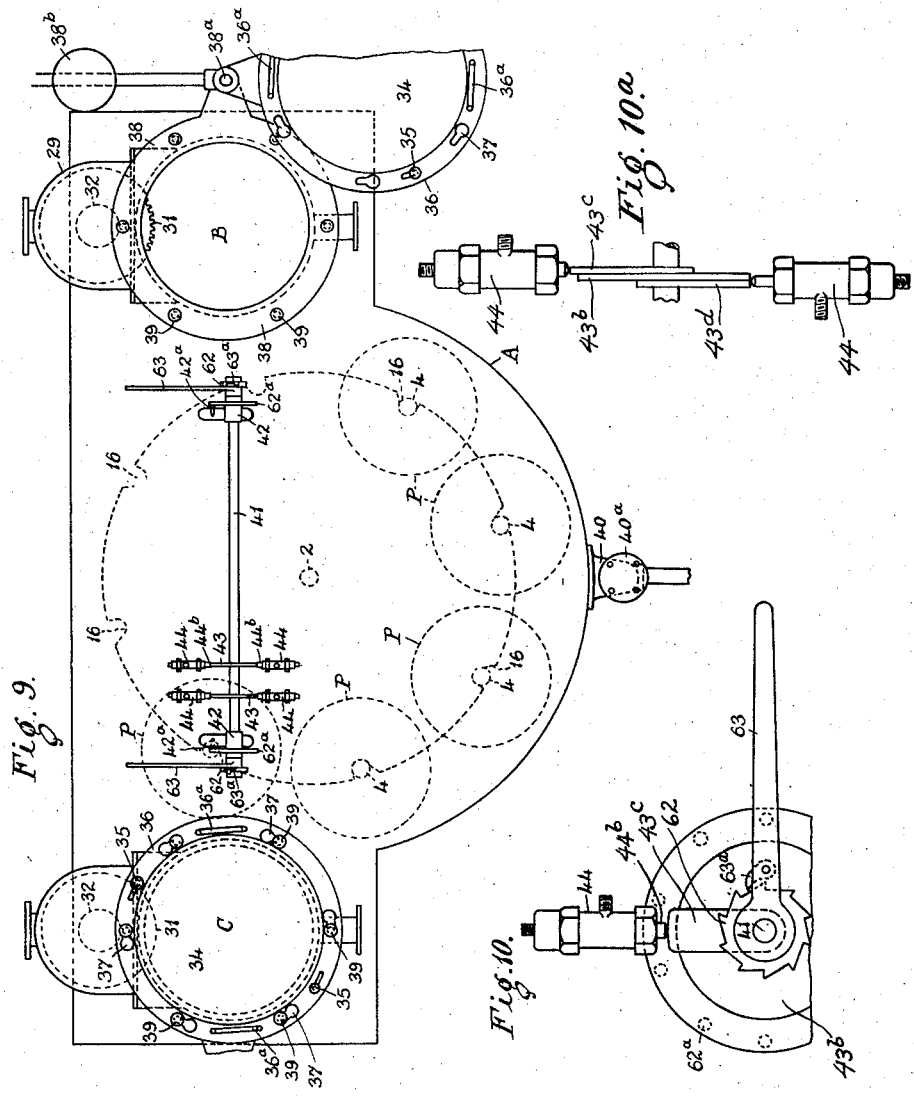

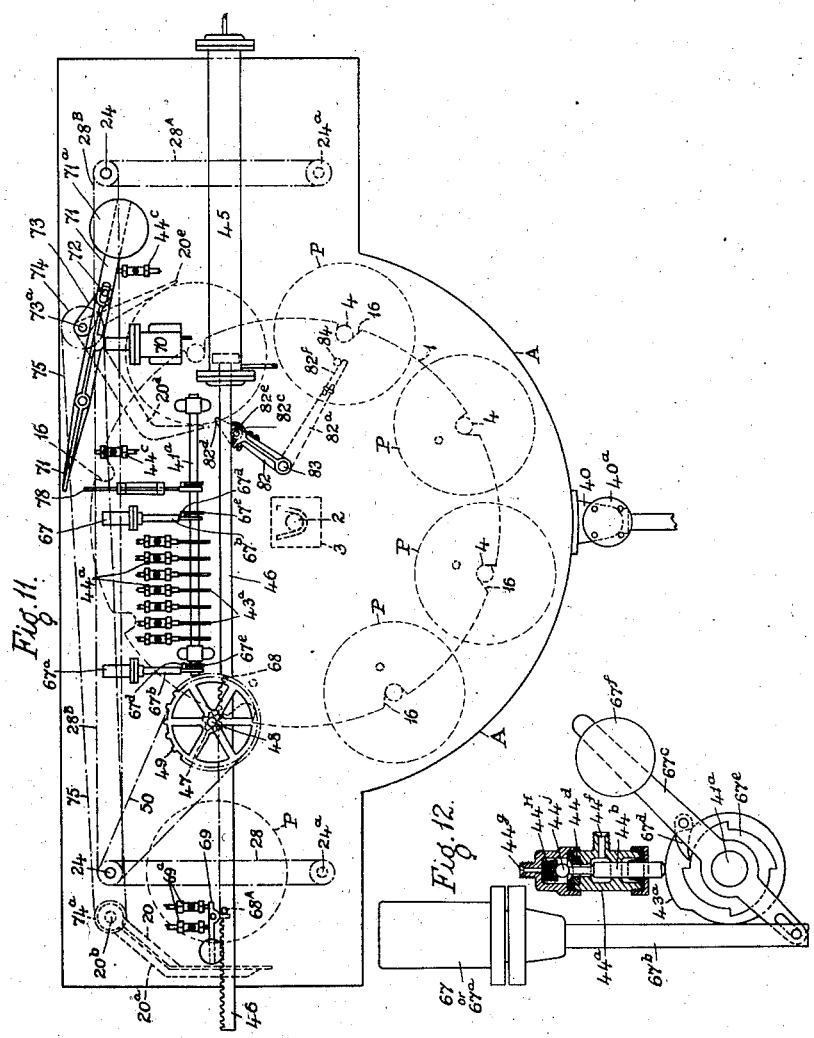

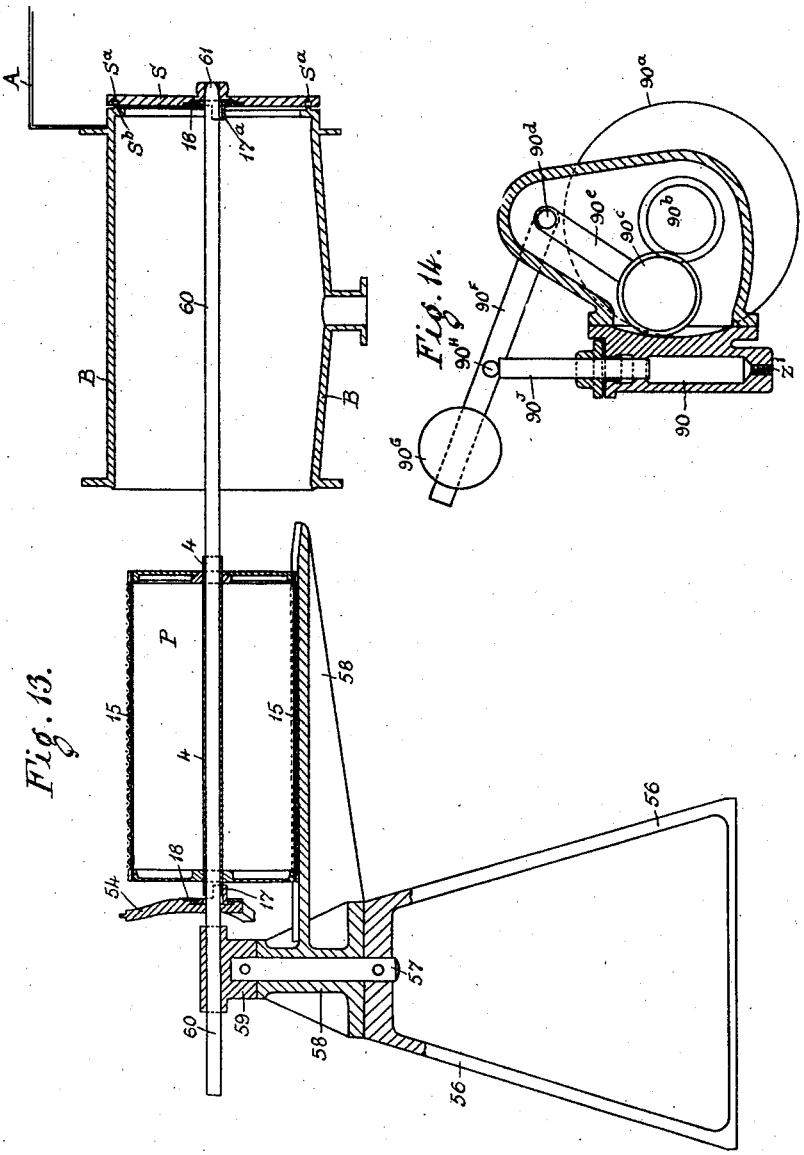

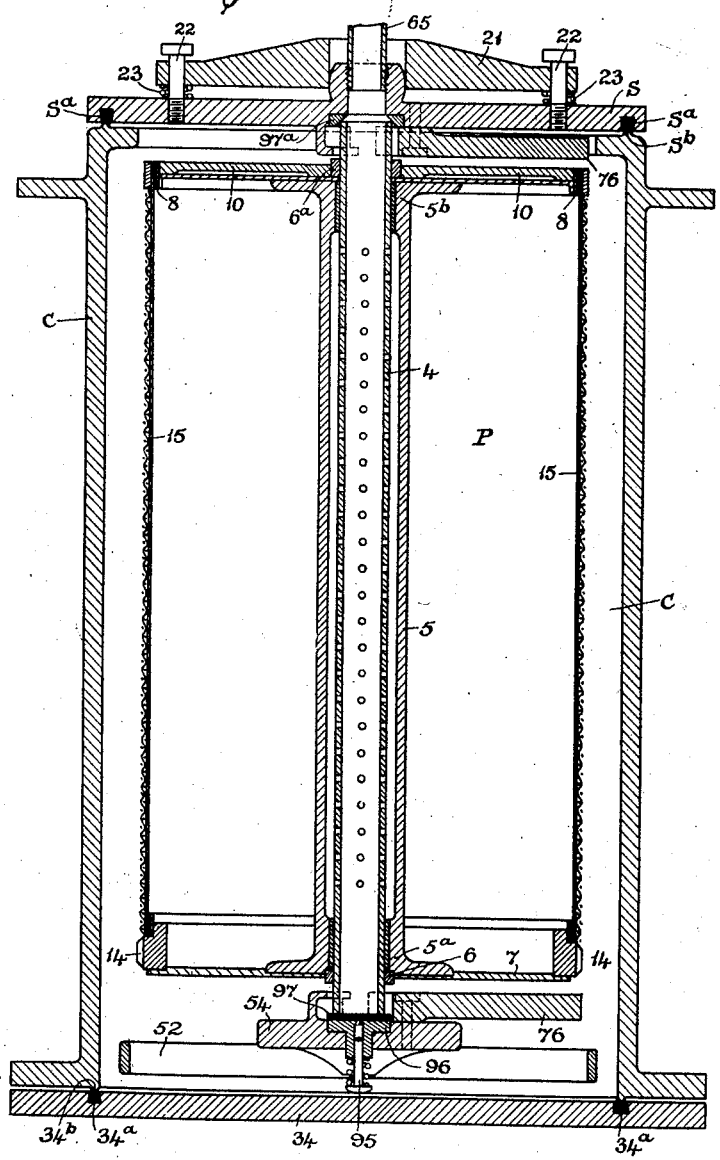

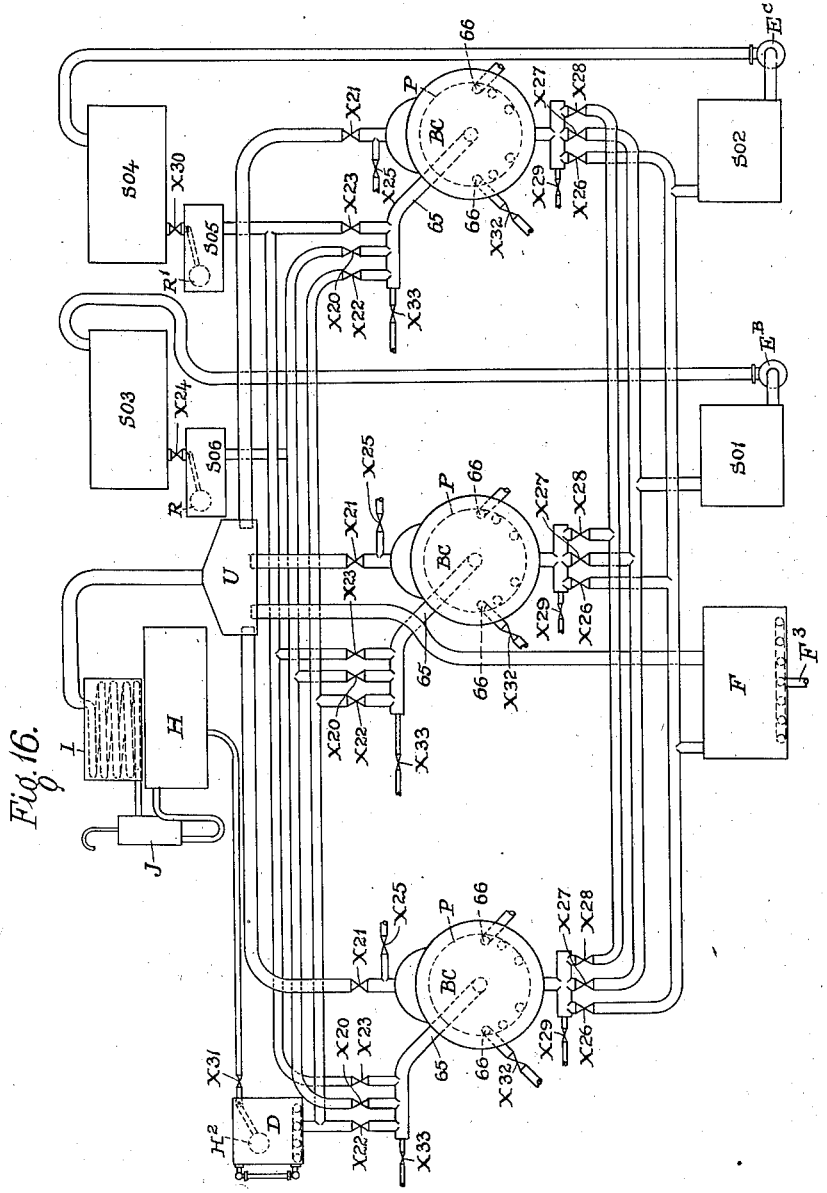

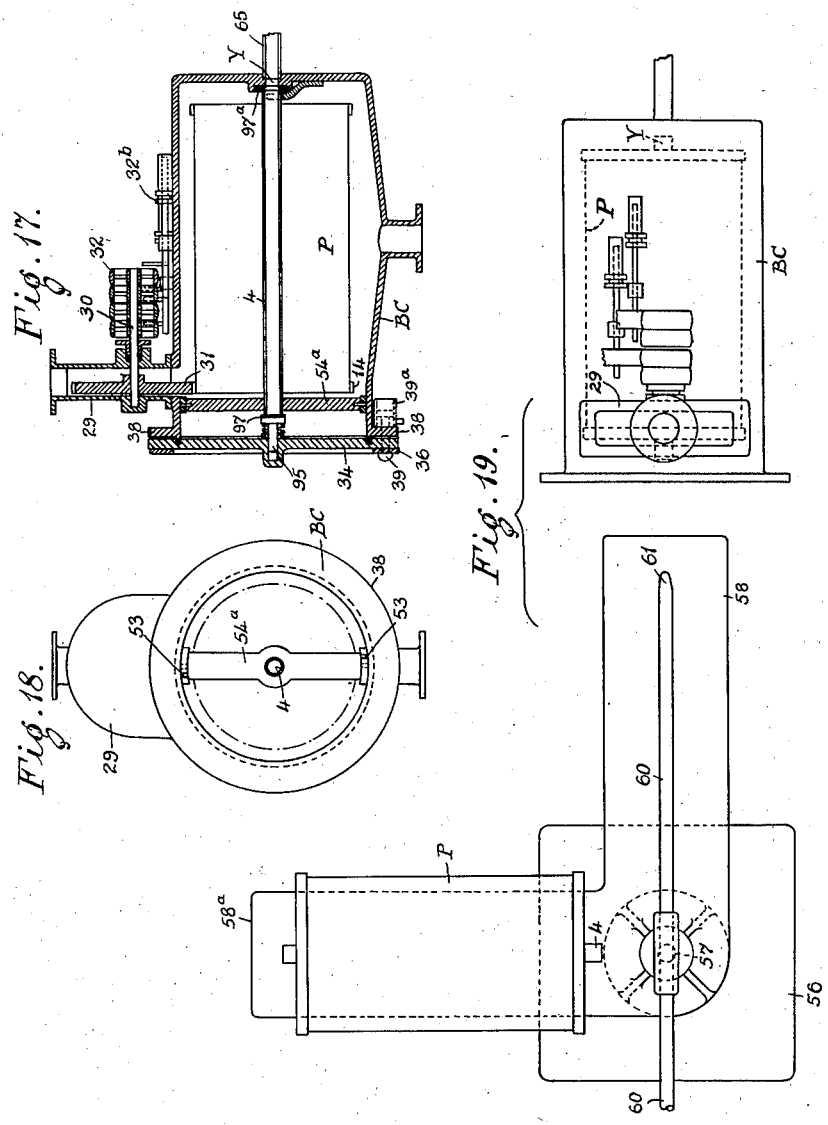

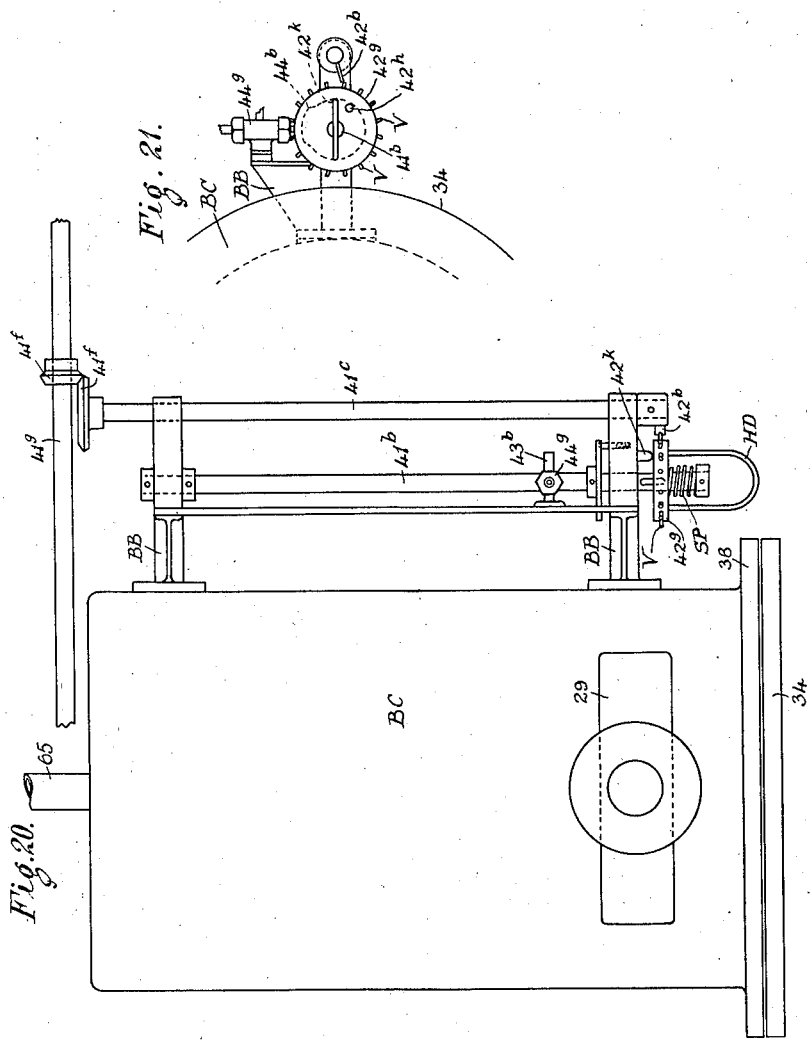

Sept. 23, 1930.   L. J. SIMON ET AL   1,776,742
METHOD OF AND APPARATUS FOR EXTRACTION OF OILS,
FATS, WAXES, GREASES, AND THE LIKE FROM
MATERIAL CONTAINING THE SAME
Filed April 8, 1926   15 Sheets-Sheet 13

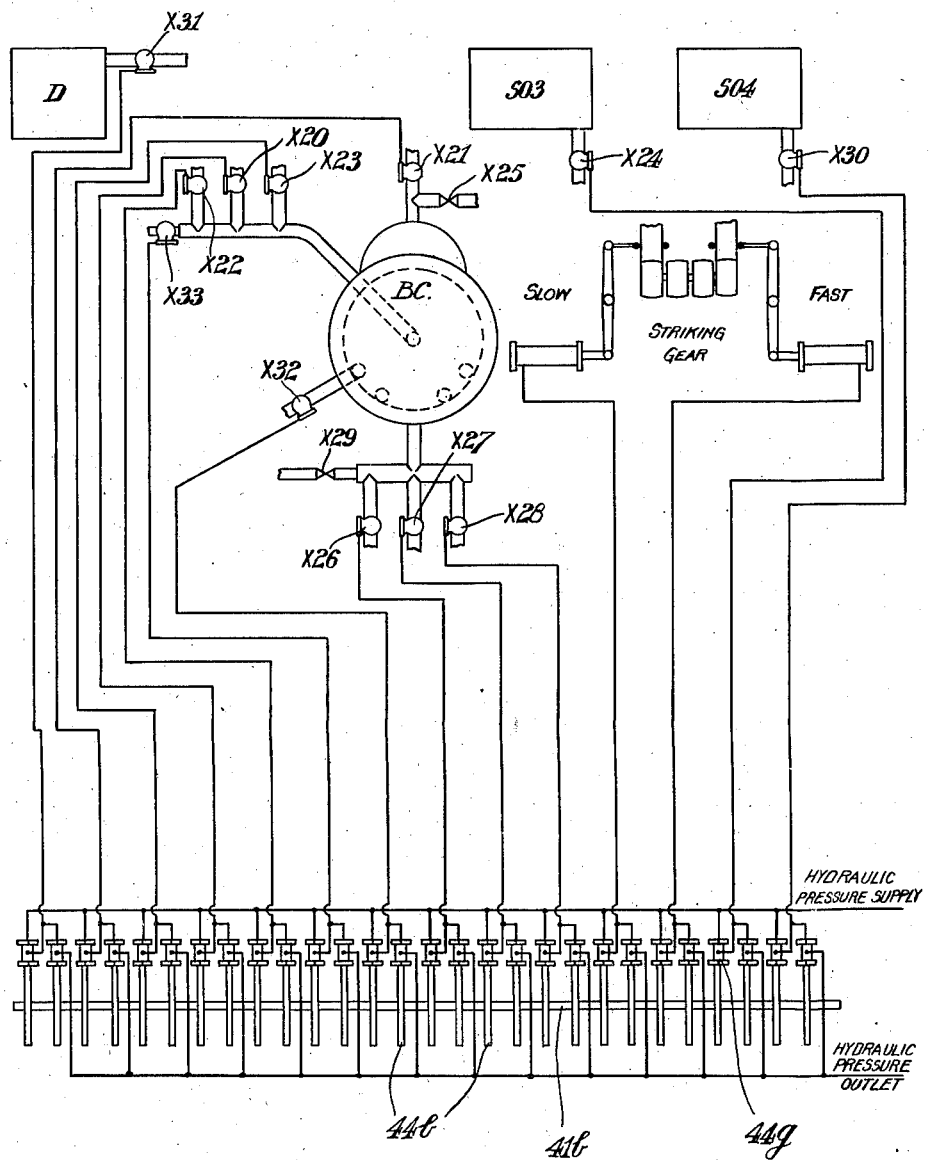

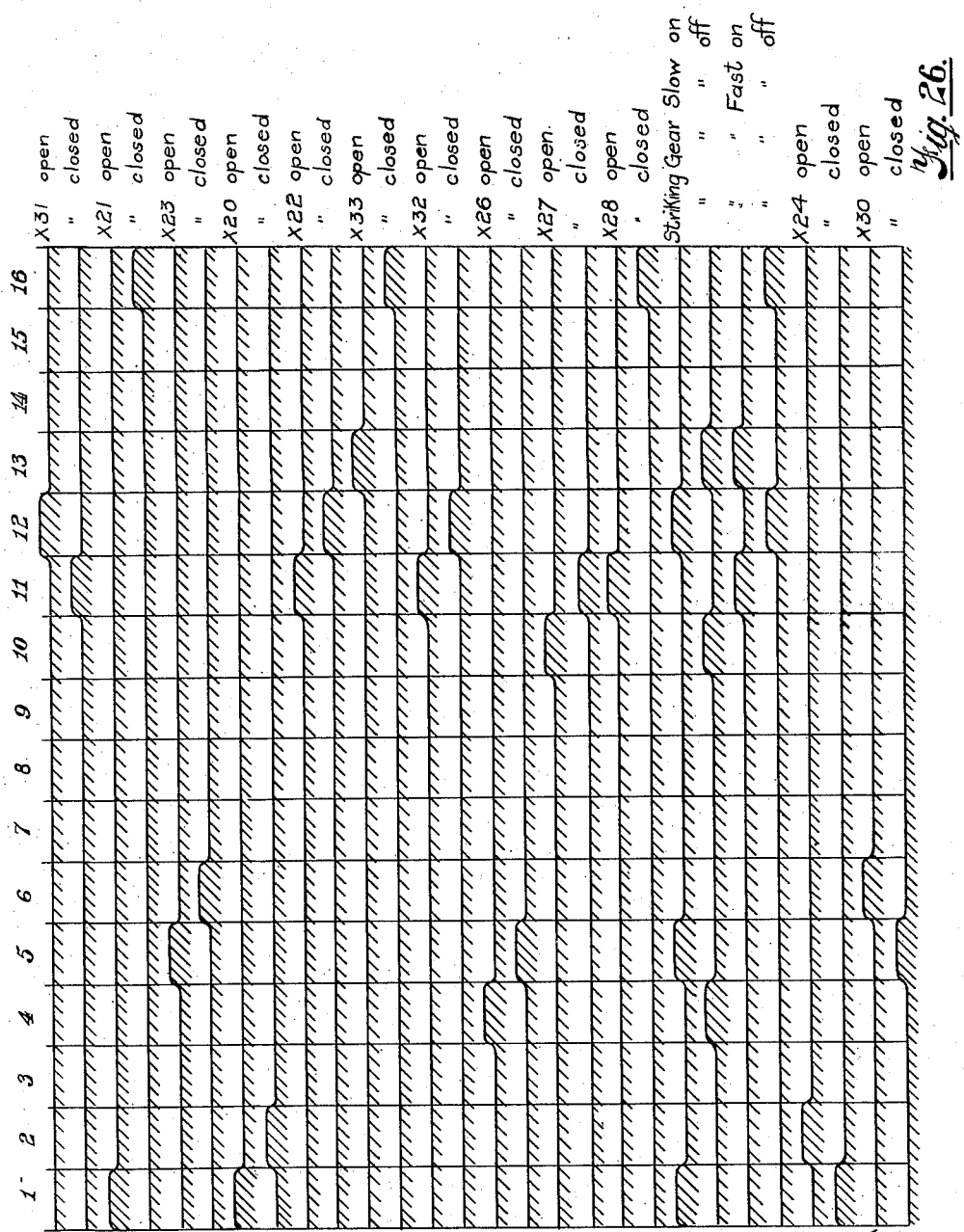

Patented Sept. 23, 1930

1,776,742

UNITED STATES PATENT OFFICE

LOUIS JOHN SIMON AND ABRAM SIMON, OF LONDON, ENGLAND, ASSIGNORS TO SIMON BROS. (ENGINEERS) LIMITED, OF LONDON, ENGLAND, A COMPANY OF GREAT BRITAIN

METHOD OF AND APPARATUS FOR EXTRACTION OF OILS, FATS, WAXES, GREASES, AND THE LIKE FROM MATERIAL CONTAINING THE SAME

Application filed April 8, 1926, Serial No. 100,658, and in Great Britain April 20, 1925.

This invention relates to a method of and an apparatus for the extraction of oils, fats, waxes, greases and the like from materials containing the same by means of solvent in liquid or vapor form and under heat treatment.

In carrying out the invention, the material to be treated is charged into rotatable baskets which are introduced into a closed vessel and are there treated successively with solvent and steam and are at the same time rotated so as to be subjected to centrifugal action.

An important feature of the invention is that means for rotating the baskets and for delivering steam and solvent to the baskets comprises a cam shaft which actuates controlling devices, such as hydraulic valves, which control the starting, stopping and speed of rotation of the baskets, the supply of steam and solvent to the baskets, and the flow of solvent and vapor to and from the reservoirs and distillers, whereby all the operations, except that of loading and unloading the baskets, are performed automatically in cyclic succession.

In the past, most attempts to increase output in solvent extraction have been in the direction of increasing the size of the vessel in which the extraction is to be accomplished. Under these conditions the extraction of an average oil-seed has consumed from six to twelve hours or even longer, with an interval between each extraction during which the vessel is discharged and re-charged with crushed meal. Such a method requires the expenditure of a large amount of labor at the end of each extraction period, and during the operation much time is lost in the flow of solvent through the meal, and in many plants very weak solutions of oil must be distilled. On the other hand, both the meal and the extracted oil must be freed of solvent, and this is usually effected, in the case of the meal, by open steaming for from two to four hours, according to the size of the plant, and, in the case of the oil, by both dry and wet distillation. This long period of steaming of the meal usually results in the presence of a high percentage of moisture, and may make the extraction of some seeds difficult, if not almost impossible. In fact, the size of the extraction vessel is often limited by the steaming conditions.

In such a plant large condensers are necessary to deal with the vapor of the solvent and water at the maximum rates of condensation. Attempts have been made to avoid the distillation of weak solutions of oil by using the so-called battery system, but this is possible only in very large installations. The use of agitators to facilitate the extraction usually results in inequality of the product and is now practically obsolete except for the purpose of assisting in the discharge of the extractor.

The most serious objection to the use of large-scale extraction plants is the length of time the meal and oil are subjected to heat and moisture, which causes hydrolysis of the fat and the reduction in value of the extracted oil by reason of the presence of fatty acid, because every unit of fatty acid present means a loss of another unit of good fat in the refining process.

From the chemical point of view, it is desirable that, during the process of extraction, the meal should be heated for as short a period as possible and that the steaming period should be reduced to a minimum.

In the extraction plant about to be described there is never more than 4 cwt. of material in the plant at one time, although the output in eight hours is approximately three to four tons. The total time of extraction is approximately thirty minutes, and the total time of "steaming off" of the meal, in order to free it from solvent, is from four to six minutes. This extraordinarily short period is made possible by the peculiar method of treatment, by preheating the meal to nearly the temperature of the steam, and by the fact that the steam has only to pass through a few inches of material, instead of through a depth of three or four feet, as in an ordinary type of plant. All the meal is in contact with the solvent for the same length of time, the distillation of the oil solution is taking place continuously, and only solvent well saturated with oil enters the stills. The time of heating both the meal and the oil is reduced to a minimum.

Chemical questions are still more involved when the particular type of solvent used is considered. There are obvious advantages in the use of a heavy solvent, such as trichlorethylene, in the ordinary plant, because with this material a "per ascensum" extraction can be made in a very short period. As a rule, by allowing the solvent to rise through the meal and to overflow above the meal to the extent of about half the volume of the meal itself and then draining, a satisfactory extraction may be realized. The serious questions of corrosion, health of workers, etc., however, arise, which renders the use of such solvents as trichlorethylene unpopular.

The small size and the design of a plant constructed according to the present invention makes it commercially possible to use a non-corrodible metal in its construction.

Where light solvents, such as benzene or light petroleum, are used, at least three flushes are required to produce a satisfactory commercial extraction. Since the amount of oil removed at each flush depends upon the relation between the total amount of solvent used and the amount retained by the meal after drainage, considerable quantities of solvent are required for the operation of a plant such as commonly used. A plant treating three tons of meal at a charge would usually require seven tons of solvent for its treatment. In the apparatus of the present invention the amount of solvent required for the same output is not more than one ton.

The achievement of such results by an apparatus constructed according to the present invention is due to the fact that relatively small quantities of material are dealt with at a time and that the rate of solution of the fat is high and the removal of the solvent from the meal is thorough. Large pipes are used for the entry of the solvent, continuous agitation with the solvent takes place, the depth of the meal is only a few inches, and, since the operation is conducted in a rotating cage, a minimum of liquor is left in the meal when the solvent is drained.

Although a plant of approximately 4 cwt. capacity is referred to above, it is evident that plants of larger or smaller capacity embodying the invention may be made.

Figure 1 is a side elevation showing the general arrangement of the various tanks and apparatus forming one complete extraction plant according to one form of the invention.

Figure 2 is a plan view, partly in section, of the tanks A, B, C.

Figure 3 is a longitudinal section and Figure 3ª an end view of a basket and shaft.

Figures 4 and 5 are respectively a horizontal sectional view and an end view of the tank B.

Figure 6 is a cross section of tank A on the line z z of Figure 2.

Figure 7 is a view, on a larger scale than Figure 2, of the bearing and trip mechanism for the shaft in tank B.

Figure 8 is in cross section of the tanks A and B through the line y y of Figure 2.

Figure 9 is an outside view of the tanks A, B, and C showing the doors of the tanks B and C one being open.

Figure 10 is an elevation, partly broken away of the mechanism and lever for opening the valves.

Figure 10ª is an end view thereof with the lower valve also shown.

Figure 11 is a side view of the tank A opposite to that shown in Figure 9.

Figure 12 is a part sectional elevation of the hydraulic control mechanism.

Figure 13 is a part sectional side elevation of a pedestal for receiving a basket outside the tanks B and C.

Figure 14 is a section through a gate type of valve used throughout the plant.

Figure 15 is a section of either tank B or C and showing means for forming liquid-tight joints at the ends of the hollow shaft carrying the basket.

Figure 16 is a diagrammatic view of an apparatus embodying a single tank in which the whole process can be carried out, and for the purpose of illustrating we show a battery of three tanks.

Figure 17 is a longitudinal section of one of the tanks shown in Figure 16.

Figure 18 is a front view of the tank shown in Figure 17 with its cover removed.

Figure 19 is a plan view of the tank shown in Figure 17 and of the basket changing mechanism associated therewith.

Figure 20 is a plan of the tank shown in Figure 17 and a modified form of valve-actuating mechanism associated therewith.

Figure 21 is a fragmentary view of Figure 20 showing the gear.

Figure 22:
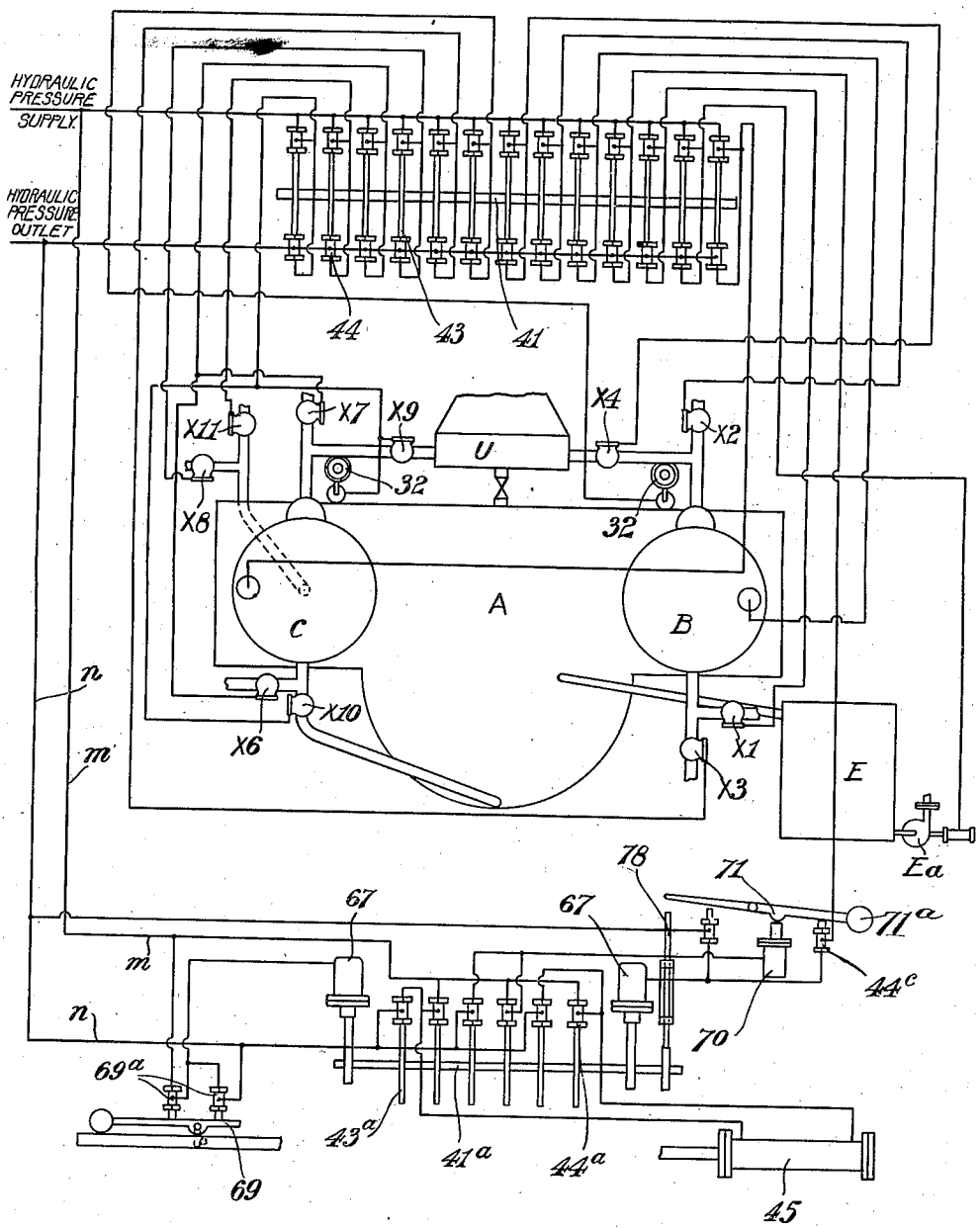

Figure 22 is a diagrammatic view showing the cam shaft and the lay-out of the hydraulic mechanism controlled and operated thereby for actuating the various valves and mechanisms for producing the sequence of operations from the insertion of the basket containing the oil-carrying substance to the distillation of the oil-carrying solvent and the re-delivery thereof.

Figure 23:
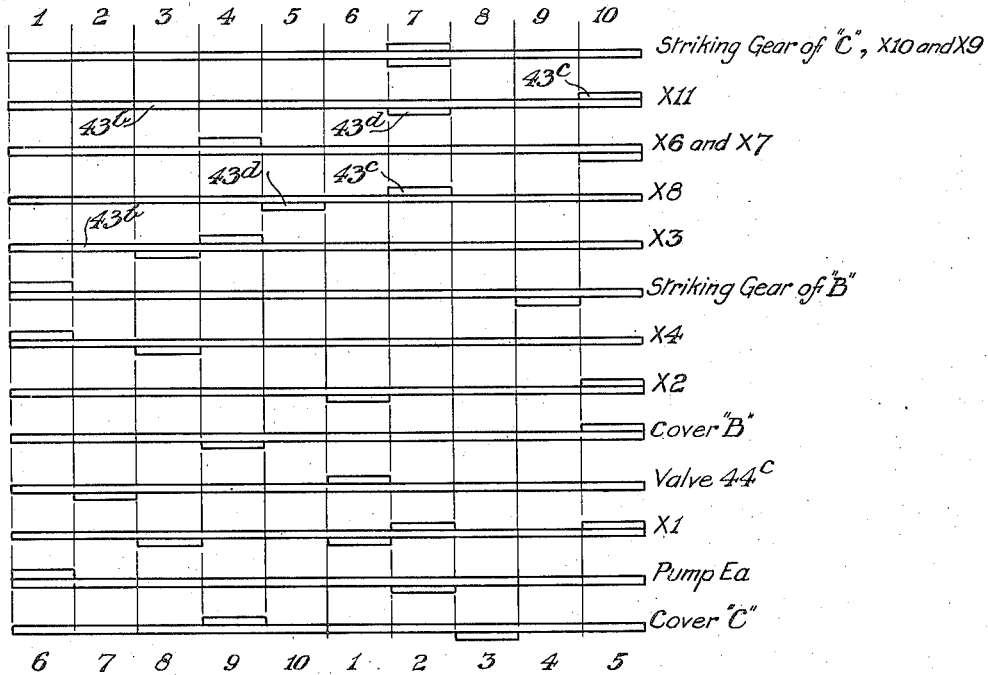

Figure 23 is a diagram showing the various stages or positions of the different cams at the initial operation throughout the complete operation, the numerals at the top indicating the cams, while the lettering at the right indicates separate mechanisms controlled thereby.

Figure 24:
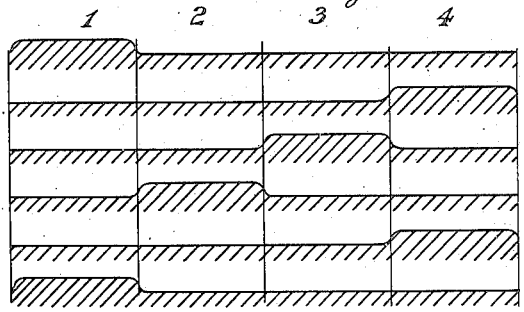

Figure 24 is a diagrammatic view of the cam development showing the four successive positions of the cam 43ª.

Figure 25 is a diagrammatic view similar to Figure 22 showing the hydraulic or pressure lines to the apparatus shown in Figures 16 to 21.

Figure 26 is a view similar to Figure 24 of the cam for operating valves shown in Figure 25, the same having reference numerals and legends applied adjacent thereto similarly to Figure 23.

In the form of the invention illustrated in Figures 1 to 15 and 22, 23 and 24 of the drawings filters or baskets P are conveyed mechanically through a main treating tank A into which the baskets are introduced from a tank B mounted on one end of the main tank and from which they are delivered into a tank C mounted on the other end of the main tank.

Referring to Figure 3, each of the baskets P consists of a framework consisting of four rods 5 connected at their ends by collars $5^a$ and $5^b$ forming bearings, which rotate on a perforated shaft 4. This framework is kept in position by means of two sleeves 6 and $6^a$ secured to the shaft 4.

Attached to the collar $5^a$ at one end of the basket is a solid plate 7, and at the other end $5^b$ is a cross bar 9 carrying a ring 8. On the cross bar 9 is fixed a locking device Q, comprising a spring projected pin 11.

Sliding on shaft 4 is a removable end plate 10 which fits into the ring 8, and, when in position and slightly rotated, the pin 11 in locking device Q engages in a hole 12 in the end plate 10.

Projecting from the inner face of the plate 10 are fixed two headed pins 13 the heads of which slip under cross bar 9, and, when the plate 10 is engaged by the locking device Q, prevent the end plate 10 from becoming detached from the basket P.

Attached to the end plate 7 is a toothed gear wheel 14, and between this gear wheel 14 and ring 8 is fixed a combined perforated tube and filter cloth 15.

Around the framework 5 inside basket P is fixed a filter cloth $15^a$, as shown in cross section of this framework in the centre of the basket P.

The teeth of gear wheel 14 are tapered at their ends to facilitate their engagement with gear wheels 31 (see Figures 8 and 9); the engagement of wheels 14 and 31 taking place sideways.

Each of the tanks B and C is provided at its outer end with a removable cover 34, which is pivotally supported upon a pin $38^a$ (Figures 2 and 9), and provided at its inner end with a movable door S (Figures 4 and 8), which is associated with a cage 55 consisting of a number of rods each connected at one of its ends to the door S and at its other end to a ring 52 (Figure 5) which is slidable along the length of the tank on guide rods 51 supported from the peripheral wall of the tank by brackets $52^a$. The ring 52 carries a spider 54 which is detachably secured to the ring by means of bayonet slots 53 and carries a bearing support 17 for one end of the shaft 4 of the basket P. The other end of the shaft of the basket is journaled in a bearing support $17^a$ carried by the door S. The door S is secured to a plate 21 which is mounted upon a pair of screw-threaded shafts 24 and $24^a$ journaled at 26 and $26^a$ in opposite ends of the tank A. A sprocket wheel 25 is keyed to each of the shafts 24 and $24^a$, and a chain 28 passing over said sprocket wheels drives one from the other. The shafts 24 each extend through a stuffing box 27 in the wall of the tank A and carries a sprocket wheel. A chain $28^b$ (Figure 11) passing over the last-named sprocket wheels causes the screw-threaded shafts 24 and $24^a$ at both ends of the tank A to rotate in unison.

When the shafts 24 and $24^a$ are rotated in one direction the plates 21 are moved lengthwise of the shafts 24 and $24^a$ and the cages 55 are moved from the tanks B and C into the tank A so as to move a charged basket P from the tank B into the tank A and to return a basket from the tank A into the tank C. The charged basket which has been introduced into the tank A from the tank B is then removed from the cage 55 and at the same time a basket which has been conveyed through the tank A is delivered to the cage 55 which has been withdrawn from the tank C. The two cages 55 are then returned to the tanks B and C by rotating the shafts 24 and $24^a$ in the reverse direction so as to return an empty cage to the tank B and to carry a charged basket into the tank C.

The means for conveying the baskets through the tank A (Figures 2, 6, 9 and 11) comprises a pair of rotary discs 1 fixed to a shaft 2 journaled at 3 in the tank A and provided with slots or recesses 16 in their peripheries adapted to receive the ends of the shafts 4 of the baskets, the shafts 4 being guided by means of guide rails $17^b$ (Figure 6).

The cage 55 associated with the tank B has semicylindrical bearing supports 17 and $17^a$ for the ends of the shaft 4 of a basket, which bearing supports are pivotally mounted, respectively, in plates 18 carried, respectively, on the spider 54 and door S and are provided with lever arms 19 (Figures 6 and 7) adapted to be rocked by lever arms 20 mounted on a shaft $20^b$ journaled in the tank A so as to deliver the ends of the shaft 4 on to inclined guide rails fixed to the walls of the tank A and adapted to transfer the basket from the cage 55 to the rails $17^b$. A fixed plate $17^d$ is provided to support the basket as the ends of the shaft 4 thereof pass from the guide rails $17^c$ to the guide rails $17^b$. The shaft $20^b$ also carries arms $20^a$ adapted to engage the cylindrical surface of the basket and to assist in transferring the same from the cage 55 to the guide rails $17^c$.

After a basket has been transferred to the rails $17^b$ the ends of the shaft 4 thereof engage in a pair of recesses 16 in the discs 1, after which the discs 1 are rotated to bring the next pair of recesses 16 into position to receive a fresh basket, the baskets in the tank A being rotated about their own axes during this movement by the engagement of their gear wheels 14 with a toothed rack $14^a$ fixed in the tank A.

While a basket is being transferred from the cage 55 associated with the tank B to the guide rails $17^b$ a basket which has been conveyed through the tank A by the rotation of the discs 1 is also transferred from the guide rails $17^b$ to the cage 55 associated with the tank C. This is effected by a pair of lever arms $20^e$, $20^d$ mounted on a rock shaft $73^a$ journaled in the tank A and adapted to receive a basket which has been conveyed through the tank A and to move it out of the recesses 16 in the discs 1 so that it rolls down an inclined part of the guide rails $17^b$ on to a pair of pivoted levers 76 mounted, respectively, on the door S and the spider 54 of the cage 55 associated with the tank C. These levers 76 conduct the ends of the shaft 4 of the basket into sockets disposed centrally of the door S and spiders 54 and are provided adjacent their fulcrums 77 with noses which are tripped by the ends of the shaft 4 as said shaft settles into the sockets. The operation of the rock shafts $20^b$ and $73^a$ is effected by a hydraulic ram 70 (Figure 11) acting on a lever 71 which is connected to the shaft $73^a$ by means of a lever 73, the shafts $73^a$ and $20^a$ being connected together by a chain 75 passing over sprocket wheels 74 and $74^a$ on the ends of said shafts, respectively.

The screw shafts 24 and $24^a$ are rotated by a rack 46 actuated by a hydraulic piston working in a cylinder 45 and operating on one of the shafts 24 through a pinion 47, sprocket wheel 49 and chain 50 (Figure 11). The rack 46 also imparts a step-by-step rotation to the discs 1 through the medium of levers 82, $82^a$ mounted on a rock shaft 83, the levers 82 engaging pins 68 on the rack 46 and the levers $82^a$ engaging pins 84 on one of the discs 1. The shaft 83 also carries a lever $82^b$ (Figure 6) adapted to rock a locking lever $16^a$ which normally engages in a recess 16 in one of the discs 1 to prevent accidental rotation thereof.

The baskets P in the tanks B and C are rotated about their own axes by means of toothed wheels 31 (Figures 8 and 9) mounted in castings 29 fixed to the walls of the tanks B and C, the shafts 30 of such toothed wheels being provided with fast and loose pulleys 32 so that the starting and stopping of the toothed wheels 31 can be controlled by striking gear $32^a$ actuated by levers $32^c$ and hydraulic rams $32^b$ (Figure 8).

The baskets P are treated with steam and solvent while they are in the tanks B and C. For this purpose the solvent feed tank D (Figure 1) is connected through a valve $X^8$ to a flexible pipe 65 which delivers clean solvent to one end of the shaft 4 of the basket in the tank C, and the flexible pipe 65 is also connected through a valve $X^{11}$ to a steam pipe in order that steam may be supplied to the shaft 4. The casting 29 on the tank C is connected through a valve $X^7$ to a vent pipe and through a valve $X^9$ to a vapor header U, from which any condensed solvent may pass into the tank A through a valve $U^1$ and any uncondensed vapor passes into a condenser I leading to a separator J and main clean solvent tank H. Solvent introduced into the tank C through the flexible pipe 65 passes out through a valve $X^{10}$ and pipe A' to the tank A where it acts on the baskets as they are conveyed through the tank A, the solvent outlet from the tank C being also connected through a valve $X^6$ to a steam pipe from which the tank C may be filled with steam.

The surplus solvent collected in the tank A runs off through a pipe $E^1$, $E^2$ into a receiver E from which it is delivered by a pump $E^a$ into the tank B where it acts on the freshly charged baskets P which are introduced into this tank. The tank B is also provided with a vapor outlet valve $X^4$, air vent pipe valve $X^2$, outlet valve $X^3$ for used solvent, and steam inlet valve $X^1$. The used solvent from the tank B passes through a pipe $F^1$ into a solution distilling tank F connected to the vapor header U. Dry heat is applied to the tanks B and C by means of steam coils 66 (Figure 2).

All of the operations on the baskets P, except that of introducing them into the tank B and removing them from the tank C, are effected automatically in cyclic succession under the control of a cam shaft 41 (Figure 2). The cam shaft 41 is moved through successive positions by means of manually actuated ratchet levers 63 (Figures 2, 9, 10 and $10^a$) and is provided with cams, each of which comprises a disc $43^b$ and a set of cam elements $43^c$ and $43^d$ on opposite sides thereof. These cams operate hydraulic valves 44 so arranged as to be operated sequentially by successive movement of the shaft 41. The hydraulic valves 44 control hydraulic rams operating the various valves which connect the tanks A, B and C to one another and to the necessary reservoirs and distillers in such a manner that the baskets are first steamed and then rotated in saturated solvent in the tank B, after which they are transferred through the tank A to the tank C where they are subjected, while being rapidly rotated, first to the action of clean solvent and then to the action of steam introduced through the pipe 65. One of these hydraulically operated valves is shown in detail in Figure 12.

The clean solvent is supplied from the feed tank D (Figure 1) which is provided with an adjustable ball valve $H^2$ capable of being set to control the quantity of solvent to be delivered to the basket P in the tank C. This quantity of solvent is subsequently transferred from the tank C to the tank A and thence through the tank E by the pump $E^a$ to the tank B, so that the measurement of solvent by the feed tank D controls the quantities throughout the cycle of treatments of the baskets.

The valves 44 also control the starting and stopping of the striking gear 32A on the tanks B and C and of the pump $E^a$ and the mechanism for conveying the baskets through the tanks A, B and C (Figures 22, 23 and 24).

One of the valves 44 is connected through a valve $44^c$ (Figures 11 and 22) controlled by the lever 71 to a ram 67 (Figure 12) which acts through a ratchet $67^c$ upon a cam shaft $41^a$ controlling a series of valves $44^a$ similar to the valves 44. The operation of the ram 67 imparts rotation to the shaft $41^a$ through a quarter of a revolution with the result that one of the valves $44^a$ is operated to supply pressure to the cylinder 45, thus advancing the rack 46 and rotating the screw shafts 24, $24^a$ through the wheels 47, 49 and chain 50, so that the cage 55 contained in the tank B is moved into the tank A carrying with it a charged basket, while the empty cage contained in the tank C is also moved into the tank A. During this movement of the rack 46 the pin 68 on said rack acts upon the lever 82, thus imparting partial rotation to the discs 1 and advancing the baskets P carried thereby through the tank A.

At the end of the movement of the rack 46 a pin $68^a$ on the rack acts through a lever 69 upon a pair of valves $69^a$ which control the supply of hydraulic pressure to a cylinder $67^a$ which acts on the shaft $41^a$ in the same way as the cylinder 67 so that the shaft $41^a$ is advanced through a further quarter of a revolution and operates a valve $44^a$ which supplies pressure to the cylinder 70, thereby operating the lever 71 to cause the basket P to be transferred from the cage 55 associated with the tank B to the discs 1. At the same time a basket P which has been conveyed through the tank A is transfered from the discs 1 to the cage 55 associated with the tank C.

The operation of the lever 71 releases the valve $44^c$, thus allowing the cylinder 67 to return to its initial position by the action of the counterweight $67^f$ and at the same time operates a rod 78 which operates through ratchet mechanism on the shaft $41^a$ to rotate the latter through a further quarter of a revolution, thereby operating a valve $44^a$ to release the pressure in the cylinder 70 and allow the lever 71 to return to its original position under the influence of the counterweight $71^a$ (Figure 22).

The return of the lever 71 re-opens the valve $44^c$, so that pressure is again supplied to the ram 67 and the shaft $41^a$ is rotated through a further quarter of a revolution, thus completing one rotation and operating one of the valves $44^a$ to supply pressure to the reverse end of the cylinder 45, thus returning the rack 46 to its original position. This movement brings one of the cages 55 into the tank C, together with the basket P which has been transferred to said cage, and at the same time returns an empty cage 55 to the tank B.

By the cycle of operations just described, a basket P has been transferred from the tank B to the tank A and another basket P has been transferred from the tank A to the tank C, thus permitting a freshly-charged basket P to be introduced into the tank B and permitting the basket contained in the tank C to be removed after it has been submitted to the final treatment which takes place in the tank C.

The covers 34 of the tanks B and C are normally locked by means of bolts 39 operated by hydraulic rams $39^a$ (Figure 2). These rams are, however, controlled by one of the valves 44 (Figures 22, 23 and 24) and are released at the proper times by the rotation of the shaft 41 so as to permit the covers 34 to be opened for insertion or withdrawal of a basket into or out of the tank B or C.

Figure 22 is a diagram of the hydraulic pressure system of the apparatus shown in Figures 1 to 15 and shows the pressure lines connecting the various control valves 44 and $44^a$ and the parts of the apparatus which are under the control of the cam shaft $41^a$.

The cam shaft $41^a$, which is indicated in the upper part of Figure 22, carries thirteen cams (Figure 5), each of which comprises a disc $43^b$ and a set of cam elements $43^c$ and $43^d$ on opposite sides thereof. The cam elements $43^c$ control the upper valves 44 which are connected to the hydraulic pressure supply (Figure 22), while the cam element $43^d$ controls the lower valves 44 which are connected to the hydraulic pressure outlet. Each of the elements of the apparatus controlled by hydraulic pressure is connected to an upper valve 44 controlling the pressure thereto and also to a lower valve 44 controlling the release of pressure therefrom.

The cam shaft $41^a$, shown in the lower part of Figure 22 (see also Figure 11) has six cams $43^a$, each of which controls one valve $44^a$. Certain of the valves $44^a$ are connected through the pressure line $m$ to the hydraulic pressure supply, while others of said valves are connected through the line $n$ to the hydraulic pressure outlet.

Figure 23 is a developed view of the cam shaft 41 showing the thirteen cams 43. The extreme upper cam in Figure 23 corresponds to the extreme left-hand cam in Figure 22. Figure 23 bears legends showing which elements are controlled by each of the cams shown.

Figure 24 is a developed view of the cams 43$^a$ showing the four successive positions thereof.

In the operation of the apparatus, the shaft 41 is rotated by hand successively through ten positions corresponding to one complete revolution of the cam shaft. In Figure 23 the parts of the cams 43 which cooperate with the upper valves 44 in each of the ten successive positions are indicated by the numerals 1 to 10 at the top of said figure and the parts of the cams 43 which cooperate with the lower valves 44 in the ten successive positions of the cam shaft are indicated by the numerals 1 to 10 along the lower edge of the figure.

In the first position of the cam shaft 41 the tank B contains a rotating basket P undergoing the first solvent flush. The striking gear 32 for the tank B is in the "on" position, the valve $X^4$ is open and the pump $E^a$ is running. The basket P in the tank C is rotating and undergoing steaming, the solvent outflow $X^{10}$ and vapor outflow $X^9$ are open. Steam is supplied to the basket through the valve $X^{11}$.

In the second position of the cam shaft 41 the pump $E^a$ is at rest but the basket in the tank continues to rotate in the solution which has been pumped into said tank. The striking gear 32 for the tank C, however, is in the "off" position to stop the rotation of the basket P therein and the steam valve $X^{11}$, solvent outflow $X^{10}$, and vapor outflow $X^9$ are closed.

In the third position of the cam shaft 41 there is no change in the tank B but the pressure in the cylinders 39$^a$ on the bolts 39 which secure the cover 34 of the tank C is released to permit the basket in this tank to be removed by hand.

In the fourth position of the cam shaft 41 the striking gear 32 for the tank B is in the "off" position to stop the rotation of the basket in said tank and the valve $X^3$ is opened to permit the solvent to run out of said tank into the vessel F. The pressure to the cylinders 39$^a$ of the hydraulic bolts 39 for the cover 34 of the tank C is on to secure the cover in place, and the valves $X^6$ and $X^7$ are open to effect the steaming of the tank C.

In the fifth position of the cam shaft 41 there is no change in the tank B but the valves $X^6$ and $X^7$ which control the steaming of the tank C are closed.

In the sixth position of the cam shaft 41 the hydraulic pressure is supplied to the plunger 67 by way of the valve 44$^c$ (Figure 22) with the result that the mechanism shown in Figures 6, 9 and 11 is set in motion and the baskets in the tanks A, B and C are automatically moved to bring one of the baskets from the tank A into the tank C and to move a basket from the tank B into the tank A.

In the seventh position of the cam shaft 41 the valve $X^1$ is open for the purpose of steaming the tank B, which is now empty, and the striking gear 32 for the tank C is moved into the "on" position to set the basket P, which has been transferred to that tank, in rotation. At the same time the valves $X^8$, $X^9$, and $X^{10}$ are opened for the purpose of effecting the final flush with solvent of the basket P contained in the tank C.

In the eighth position of the cam shaft 41 the steaming of the tank B is stopped by the closing of the valve $X^1$, and the valves $X^3$ and $X^4$ are also closed. The final flush with solvent in the tank C continues, there being no change in this tank.

In the ninth position of the cam shaft 41 the hydraulic bolts 39 which secure the cover 34 of the tank B are released for the purpose of enabling a fresh basket P to be introduced into the tank B by hand. The final flush in the tank C continues.

In the tenth position of the cam shaft 41 the hydraulic bolts 39 for the cover 34 of the tank B are again supplied with pressure to secure the cover in place and the valves $X^1$ and $X^2$ are opened for the purpose of steaming this tank. By this time the final flush with solvent in the tank C will have been completed and the valve $X^8$ is, therefore, closed. The valve $X^{10}$, however, remains open and the valve $X^{11}$ is opened for the purpose of steaming the baskets P in the tank C.

The insertion of a basket P into a tank B or C and its withdrawal therefrom is effected by means of the apparatus shown in Figure 13. This comprises a standard 56 carrying a bracket 58 adapted to support the basket and provided with a shaft 60 which is detachably supported at one end in a swivel bearing 59 mounted on the bracket 58 and at its other end 61 in a socket in the door S. The rod 60 is pushed through the shaft 4 of the basket P and serves to guide and support the basket so as to enable it to be pushed by hand from the bracket 58 into the tank B' or from the tank C onto the bracket 58. During these operations the spider 54 is detached from the ring 52 and slipped onto the shaft 60 as shown in Figure 13.

In the embodiment of the invention shown in Figures 16 to 20, 25 and 26 all of the operations on the baskets P are carried out in a single tank BC, so that no gear for conveying the baskets P from one tank to another is necessary. As shown in said figures, there are three tanks BC, all of which are connected in the same way to the various reservoirs and distillers. It is obvious that one or any desired number of tanks BC may be provided according to the number of baskets P which it is desired to treat at the same time.

Tanks BC (see Figure 17) are the extraction chambers into which baskets P (see Figure 3) containing the material to be treated are charged.

Tank $SO^1$ is a solvent solution tank fed by tanks BC and feeds the upper solution tank $SO^3$ by means of pump EB.

Tank $SO^6$ is a solution measuring tank and is fed by solution tank $SO^3$. and supplies solution for the first flush of the material being treated in tanks BC. This measuring tank is fitted with a ball valve R capable of a hand setting to control the supply of solution into this tank.

Tank $SO^2$ is a solvent solution tank fed by tanks BC and feeds the upper solution tank $SO^4$ by means of pump EC.

Tank $SO^5$ is a solution measuring tank fitted with adjustable ball valve $R^1$, and is fed by solution tank $SO^4$, and supplies solution for the second flush of the material being treated in tanks BC.

H is the main clean solvent tank, supplying clean solvent to the measuring tank D, which tank D is fitted with an adjustable ball valve $H^2$, and furnishes the last flush of solvent to the material being treated in tanks BC.

I is the condenser.

F is the distiller tank, with outlet pipe $F^3$ leading to distillers (not shown).

Figure 17 shows one of the tanks BC with a basket P in position with the door 34 closed.

Figures 17 to 21 show three important alterations to the tanks B and C as previously described, these being:—

1. The tanks BC are closed at one end.
2. A bearing bar $54^a$ replaces bracket 54; the ring 52 with its rods, is in this case not necessary.
3. For striking the pulleys 32 is a countershaft on which countershaft is fixed a plunger similar to $32^b$ controlling a striking gear with two belts for the purpose of changing the speed of this countershaft, as at Figure 8, and so varying the speed of shaft 30, the pulleys 32 merely providing the "on" and "off" positions. Joint 97 seals one end of shaft 4 of basket P, and joint $97^a$ makes joint at the other end of the shaft 4 through which solvent solution, solution and steam enter the centre of the basket P by means of pipe 65.

Figure 18 shows the front of the tank BC which is open, with the means for securing the bearing bar $54^a$ in position.

Figure 19 in a plan view of the pedestal with two extending arms 58, $58^a$ at right angles to one another, rotating on pin 57. This is shown standing in front of a tank BC with the door 34 removed, and basket P in position ready for the rod 60 to enter the shaft 4 of same.

Figure 20 shows a tank BC with the cam shaft $41^b$ fixed on its side by means of brackets and bearings BB, this cam shaft $41^b$ is driven by means of shaft $41^c$, which shaft $41^c$ is driven through bevel wheels $41^f$ by means of shaft $41^g$, which shaft $41^g$ runs at the rear of tanks BC, and drives all of the cam shafts $41^b$ attached to tanks BC.

On the shaft $41^b$ are fixed a number of cams $43^b$, operating on hydraulic control valves $44^g$, which operate valves and plungers as already described (see Figures 12 and 13).

On cam shaft $41^b$ is also fixed a wheel plate $42^g$ having sixteen pins V on its periphery.

Fixed on shaft $41^c$ is a wiper $42^b$, which engages at every revolution with one of the pins on the periphery of wheel plate $42^g$, making sixteen revolutions of the shaft $41^c$ necessary for one revolution of the cam shaft $41^b$.

The wheel plate $42^g$ slides laterally on shaft $41^b$, and on its side is a hole $42^h$ on the same radius as a fixed pin $42^k$, resulting in the plate wheel $42^g$ being depressed over pin $42^k$ by spring SP whenever the hole $42^h$ is in line with pin $42^k$, bringing the wiper $42^b$ out of alignment with the pins of wheel plate $42^g$, thus bringing to a standstill the cam shaft $41^b$ until the handle HD carried by the plate $42^g$ is pulled out and rotated by hand.

In describing the working of this plant, we deal with only one extraction chamber BC, all the operations being the same for all the tanks BC, which, although working independently of each other, yet work together as one complete unit.

The operation is as follows:

Basket P is charged with material in the manner already described and is placed on one of the arms $58^a$, the other arm being empty.

The hydraulic bolts 39 of the tank BC, which is being charged, are now released by hand, and door 34 opened in the manner already described.

The arm $58^a$ on which a basket P is positioned, is now rotated into position facing the tank BC.

On the shaft 60 is placed the bearing bar $54^a$, and rod 60 is slid through shaft 4 of basket P until the tapered end 61 is resting in hole Y, whereupon the basket P and bearing bar $54^a$ are slid into the tank BC. The bearing bar $54^a$ is slightly rotated to engage the bayonet joints 53 to hold it in the tank BC and shaft 60 is withdrawn. The door 34 is now closed in the manner already described, at the same time one end of the shaft 4 is sealed by means of joint 97, and shaft 4 is pressed into the joint $97^a$ at the other end. Hydraulic pressure is now applied by hand to hydraulic bolts 39, and at the same time valves $X^{25}$ are held open by the hand, allowing steam to pass through to the atmosphere, removing the air contained in the tank BC. Valves $X^{29}$ and $X^{25}$ are now closed by hand, and handle HD (see Figure 20) pulled forward, until hole 42ʰ of plate wheel 42ᵍ is clear of the pin 42ᵏ, when the plate wheel 42ᵍ is rotated, bringing the pins on the periphery of plate wheel 42ᵍ in line with the wiper 42ᵇ fixed to the slowly rotating shaft 41ᶜ.

At one revolution of shaft 41ᶜ, shaft 41ᵇ is moved one stage and operates the appropriate valves 44ᵍ (Fig. 25) to start the rotation of the basket at slow speed and to supply saturated solution from the feed tank SO⁶ through the valve X²⁰ to the tank BC. The shaft 41ᵇ is now rotated through successive positions to operate the valves 44ᵍ which control the starting and stopping and the speed of the driving gear, the supply of steam and the flow of solvent through the various reservoirs and distillers so that the basket is subjected to a definite series of treatments with steam and solvents.

When this series of treatments is completed the appropriate valve 44ᵍ is operated to stop the rotation of the basket and to release the bolts 39 so as to permit the door 34 to be opened and a freshly charged basket to be introduced into the tank BC.

Figure 25 is a diagrammatic lay-out of the pressure lines in connection with the modified arrangement of apparatus shown in Figs. 16–21, the connections being shown between the hydraulic pressure valves 44ᵍ (see Fig. 20) and the various elements of the apparatus which are controlled thereby.

The cam shaft 41ᵇ carries 28 cams, each cam controlling one of the series of valves 44ᵍ. Each of the hydraulic control elements of the apparatus is connected to two valves 44ᵍ of which one controls the supply of pressure from the high pressure supply, while the other controls the release of pressure to the high pressure outlet. The design of these cams is shown in Fig. 23 of the drawings which is a series of developed side views of the cams. The legends in the column at the right-hand side of the figure indicate which elements of the apparatus are controlled by each cam, there being two cams for each element, one for opening or supplying hydraulic pressure, and the other for closing or releasing hydraulic pressure. The numbers 1—16 at the top of the figure indicate the parts of the cams which co-operate with the valves 44ᵍ at each of the 16 successive stages which constitute a complete rotation of the cam shaft.

From the above, it will be seen that although the complete plant of three tanks BC (or more if desired) form a complete unit and work as such, yet each individual tank BC operates independently of the others, and can be put into operation with the others if desired.

We claim:

1. Apparatus for extracting oils, fats, waxes and the like from materials containing the same including a closed vessel, a basket insertable in said vessel for receiving charges of the material to be treated, said basket having a central conduit passing therethrough and communicating with the basket; means disposed within said closed vessel for supporting said basket and rotating the same; means for introducing solvents and steam into said basket through the central conduit thereof; a plurality of valves for controlling the admission of the solvents and steam to and from the basket and vessel; and a means for operating said valves in cyclic succession.

2. Apparatus for extracting oils, fats, waxes and the like from materials containing the same according to claim 1 including connected reservoirs and distillers for the solvent material and controlling means operated by said valve operating means for controlling the flow of solvents through said reservoirs and distillers.

3. Apparatus for extracting oils, fats, waxes, and the like from materials containing the same comprising a main treating tank; delivery tanks communicating with said treating tank; a series of baskets for receiving charges of the material to be treated, a central perforated conduit passing through each basket and communicating therewith; means for transferring said baskets from one of said delivery tanks to said main tank and from said main tank to another of said delivery tanks; means for conveying said baskets through said main tank; means for feeding steam and solvents through the perforated conduit to each of said baskets in said delivery and treating tanks; means for rotating said baskets in said delivery tanks, means for controlling the starting, stopping and speed of rotation of said baskets, the transfer of said baskets to and from said treating tanks, and conveying of said baskets through said treating tanks, valves for controlling the supply and withdrawal of steam and solvents to and from said baskets, and a timed cam shaft for operating said controlling means and valves in cyclic succession.

4. Apparatus for extracting oils, fats, waxes, and the like from materials containing the same comprising a closed vessel; a series of baskets for receiving charges of the material to be treated; a central perforated conduit passing through each basket and communicating therewith; means disposed within said closed vessel for supporting a basket and for rotating the same; means for varying the speed of rotation of the baskets; connected reservoirs and distillers for solvent materials; means for feeding solvent to the central conduit of a basket in the closed vessel; means for removing used solvent from said closed vessel; means for introducing steam to the central conduit of a basket in said closed vessel; means for steaming and exhausting said closed vessel; means for controlling the starting, stopping, and speed of rotation of the basket; valves for controlling the flow of solvent through said reservoirs and distillers and the flow of steam and solvent to and from said closed vessel; means for controlling the steaming and exhausting of said closed vessel; and automatic means for operating said valves in cyclic succession.

5. Apparatus for extracting oils, fats, waxes and the like from materials containing the same according to claim 1 including a measuring container for the solvent, and means operated by said valve operating means for controlling the delivery of measured quantities of solvent from said container to said baskets.

6. Apparatus for extracting oils, fats, waxes and the like from materials containing the same according to claim 1 including means operated by the valve operating means for controlling the delivery of solutions of different densities to said closed vessels in cyclic order.

7. Apparatus for extracting oils, fats, waxes and the like from materials containing the same according to claim 1 including heating coils in the closed vessel for heating the same prior to steaming, and means operated by the valve operating means for controlling the supply of heating fluid to said heating coils.

8. In an apparatus for extracting oils, fats, waxes and the like from substances containing the same, the combination of an enclosed casing, a perforated cylinder removably mounted within said casing, a hollow perforated shaft forming the axis of said cylinder, means for admitting a solvent through said shaft to be sprayed into the interior of the cylinder during the rotation thereof, means for draining the solvent after passing through the said substance, means for directing steam through said shaft to heat said substance, means for delivering the oil and solvent for distillation, and manually started mechanism for operating the solvent admitting, solvent draining, steam directing and oil and solvent delivering means in sequential order.

9. In an apparatus for extracting oils, fats, waxes and the like from substances containing the same, the combination of an enclosed casing, a perforated axially rotatable cylinder to contain the substance to be treated removably mounted within said casing, a hollow perforated shaft forming the axis of said cylinder, means for admitting a solvent through said shaft to be sprayed into the interior of the cylinder during the rotation thereof, means for draining the solvent after passing through the said substance, means for directing steam through said shaft to heat said substance, means for discharging the oil and solvent for distillation, and manually started mechanism for operating the solvent admitting, solvent draining, steam directing, and oil and solvent discharging means in sequential order and for stopping said solvent-admitting, solvent draining and steam directing means when said oil and solvent discharging means has been operated, whereby the substance acted upon can be withdrawn and a new charge inserted.

In testimony whereof we have hereunto set our hands.

LOUIS JOHN SIMON.
ABRAM SIMON.